(12) United States Patent
Nakano et al.

(10) Patent No.: US 9,727,952 B2
(45) Date of Patent: Aug. 8, 2017

(54) CONTROL DEVICE FOR CONTROLLING A CONTROL VALUE IN A FIRST ORDER INFINITE IMPULSE RESPONSE FILTER

(71) Applicant: SAMSUNG DISPLAY CO., LTD., Yongin, Gyeonggi-Do (KR)

(72) Inventors: Takashi Nakano, Yokohama (JP); Mitsuharu Baba, Yokohama (JP)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 0 days.

(21) Appl. No.: 14/728,334

(22) Filed: Jun. 2, 2015

(65) Prior Publication Data

US 2015/0356711 A1    Dec. 10, 2015

(30) Foreign Application Priority Data

Jun. 4, 2014   (JP) .................. 2014-115559

(51) Int. Cl.
*G06K 9/40*      (2006.01)
*G06T 5/00*      (2006.01)

(52) U.S. Cl.
CPC .......... *G06T 5/002* (2013.01); *G06T 2200/28* (2013.01); *G06T 2207/10004* (2013.01); *G06T 2207/20182* (2013.01)

(58) Field of Classification Search
CPC ...... H04N 1/4092; H04N 5/142; H04N 5/144; H04N 5/20; H04N 5/21; H04N 5/213; H04N 5/455; H04N 5/46; H04N 17/00; G06T 5/002; G06T 5/004; G06T 2207/20012; G06T 2207/201925; G06T 5/008; G06T 2207/20192; G09G 5/10; G09G 2323/0271

See application file for complete search history.

(56) References Cited

U.S. PATENT DOCUMENTS 7,881,549 B2 *   2/2011   Yamashita ............. G06T 5/004
                                            348/622
7,894,684 B2 *   2/2011   Monobe .................. G06T 5/008
                                            348/622
7,903,898 B2 *   3/2011   Ito .......................... G06T 5/004
                                            348/622

(Continued)

FOREIGN PATENT DOCUMENTS

EP       2439927 A1    4/2012
EP       2477049 A2    7/2012

(Continued)

OTHER PUBLICATIONS

Takamichi Nakano, Development of the NR-FIFO Series Imaging Noise Reduction LSI, OKI Technical Review, Oct. 2003, Issue 196 vol. 70, No. 4.

(Continued)

*Primary Examiner* — Jose Couso
(74) *Attorney, Agent, or Firm* — Lee & Morse, P.C.

(57) ABSTRACT

A control device includes a flatness calculator and control-value logic. The flatness calculator calculates flatness of an image corresponding to an image signal. The control-value logic determines a control value based on the flatness. The control value controls a size of an operation region on which a first-order infinite impulse response (IIR) filter is to process the image signal to reduce noise.

7 Claims, 4 Drawing Sheets

(56) References Cited

U.S. PATENT DOCUMENTS

| | | | | |
|---|---|---|---|---|
| 8,248,537 | B2 * | 8/2012 | Kimura | H04N 17/00 |
| | | | | 348/701 |
| 8,311,357 | B2 * | 11/2012 | Yamashita | G06T 5/004 |
| | | | | 348/622 |
| 8,351,887 | B2 * | 1/2013 | Stevenson | H03F 1/0261 |
| | | | | 330/124 R |
| 8,406,547 | B2 * | 3/2013 | Monobe | G06T 5/008 |
| | | | | 348/622 |
| 8,712,106 | B2 | 4/2014 | Uchida et al. | |

FOREIGN PATENT DOCUMENTS

| | | |
|---|---|---|
| JP | 2000-050275 A | 2/2000 |
| JP | 2006-014164 A | 1/2006 |
| JP | 2011-254223 A | 12/2011 |

OTHER PUBLICATIONS

N. Yuichi et al., A Motion-Compensated Noise Reducer, etc., NHK Science and Technical Research Laboratories, vol. 39, No. 10, 1985.

\* cited by examiner

CONTROL DEVICE FOR CONTROLLING A CONTROL VALUE IN A FIRST ORDER INFINITE IMPULSE RESPONSE FILTER

CROSS-REFERENCE TO RELATED APPLICATION

Japanese Patent Application No. 2014-115559, filed on Jun. 4, 2014, and entitled, "Control Device," is incorporated by reference herein in its entirety.

BACKGROUND

1. Field

One or more embodiments described herein relate to a control device.

2. Description of the Related Art

An image represented by a digital image signal (e.g., an image signal) may have inter-frame noise generated by quantization in a compression process. Various attempts have been made to reduce this noise.

One approach involves attempting to reduce inter-frame noise based on flatness calculated from an image signal. However, this approach may generate an afterimage effect on motion images.

Another approach involves attempting to reduce noise by performing motion adaptive processing on a stop region. The motion adaptive processing involves fixing a feedback coefficient of a first-order infinite impulse response filter, and then limiting the differential between an image of a current frame and an output image. However, this approach may cause inter-frame noise to have a larger amplitude at a region of an image that includes an edge or texture.

SUMMARY

In accordance with one or more embodiments, a control device includes a flatness calculator to calculate flatness of an image corresponding to an image signal; and control-value logic to determine a control value based on the flatness, the control value to control an operation region on which a first-order infinite impulse response (IIR) filter is to process the image signal to reduce noise. The control value may control a size of the operation region. The control value may be equal to or greater than a preset, lower limit value or greater than a lower limit value. The control value may be equal to or less than a preset, upper limit value or less than an upper limit value.

The flatness calculator may include a frequency component detector to detect a signal of a predetermined frequency band from the image signal; and a calculator to calculate the flatness of the image based on the signal of the predetermined frequency band. The flatness calculator may include an adjuster to adjust the signal of the certain frequency band, and the calculator may calculate the flatness of the image based on the adjusted signal of the certain frequency band. The control device may include a setter to set the control value determined as the first-order IIR filter. The control device may include the first-order IIR filter.

In accordance with one or more other embodiments, a non-transitory computer-readable medium includes code to control a computer, the code comprising first code to calculate flatness of an image corresponding to an image signal; and second code to determine a control value based on the flatness, the control value to control an operation region on which a first-order infinite impulse response (IIR) filter is to process the image signal to reduce noise. The control value may control a size of the operation region. The control value may be equal to or greater than a preset, lower limit value. The control value may be equal to or less than a preset, upper limit value.

The first code may include code to detect a signal of a predetermined frequency band from the image signal; and code to calculate the flatness of the image based on the signal of the predetermined frequency band. The first code may adjust the signal of the certain frequency band, and the code to calculate the flatness of the image may calculate the flatness of the image based on the adjusted signal of the certain frequency band.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments are described hereinafter with reference to the drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments. Like reference numerals refer to like elements throughout.

In accordance with one or more embodiments, a reduction in in inter-frame noise in an image is performed based on a first-order frame infinite impulse response (IIR) filter (e.g., a first-order frame IIR low pass filter) to achieve a decrease in noise on a stop region or prevention of afterimage on a motion region, or both.

Figure 1:
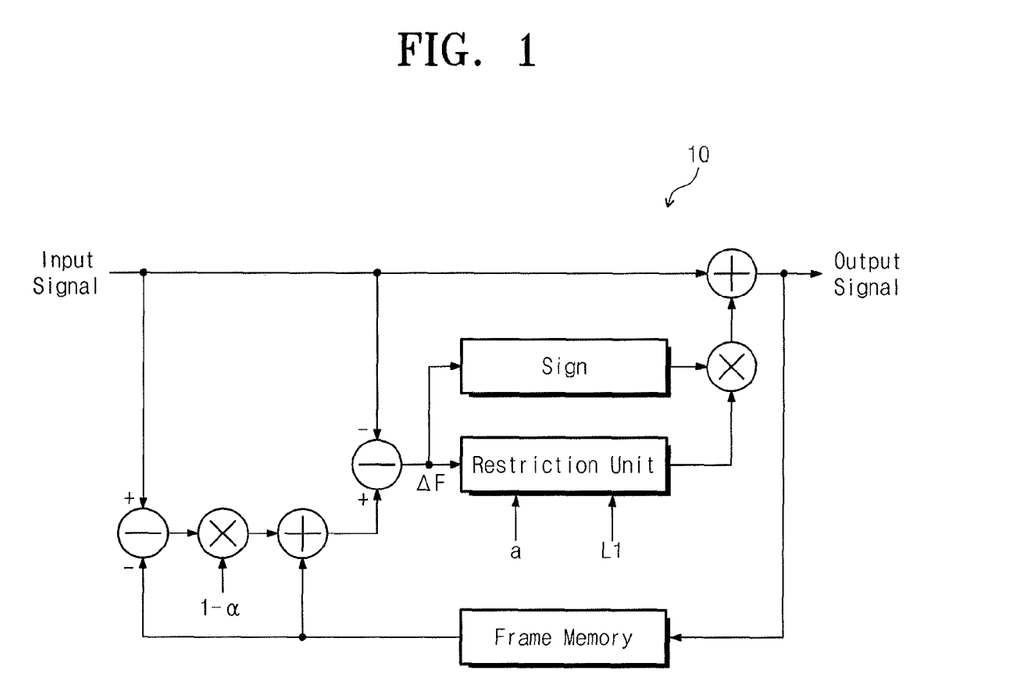
FIG. 1 illustrates a first-order frame infinite impulse response (IIR) filter.
Figure 2:
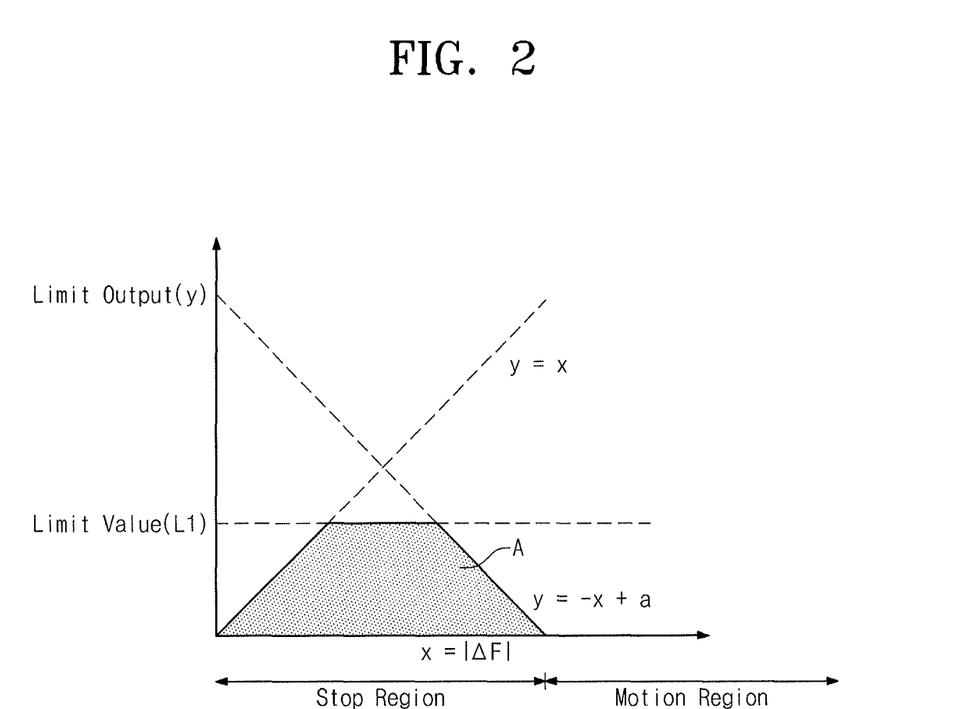
FIG. 2 illustrates a limitation unit of the first-order frame IIR filter in FIG. 1.

FIG. 1 illustrates an example of a first-order frame IIR filter 10, and FIG. 2 is a diagram explaining an example of a limitation unit of the frame IIR filter in FIG. 1.

Referring to FIGS. 1 and 2, an image signal is input to the frame IIR filter 10. The image signal may be, for example, a luminance signal or a color signal. The image signal input to the frame IIR filter 10 may be distinguished from an image signal stored in a frame memory in FIG. 1 and may be represented by an [input signal].

The parameter a in FIG. 1 is the feedback coefficient of the frame IIR filter 10 and may be a fixed value satisfying e.g., $0 \le \alpha < 1$. Alternatively, the parameter a may be a variable value that varies, for example, based on a user manipulation or input.

Processing of the limitation unit of the frame IIR filter 10 in FIG. 1 may be performed by an absolute value function |ΔF| between the input signal and an output signal of the frame IIR filter 10, as represented in FIG. 2. The function in FIG. 2 may be performed, for example, by hardware or software.

Determination of motion for motion adaptive processing may consider at least a differential between frames. However, it may be difficult to determine whether the differential is caused by motion or noise. Therefore, the limitation unit of the frame IIR filter 10 in FIG. 1 predicts an amount of previous noise and sets a parameter having a fixed value. The parameters of the frame IIR filter 10 may include L1 and a in FIG. 1. In this example, L1 is a limit value defining an upper limit of an output. The value of L1 may be a preset, fixed value. Alternatively, L1 may be a variable value that varies by user manipulation or which depends on a in FIG. 1. When L1 depends on a in FIG. 1, L1 may be set by the equation: L1=c1×a, where c1 is a fixed coefficient.

Also, the value of a in FIG. 1 is a control value defining a region on which an operation is performed to decrease noise, e.g., a region represented by A in FIG. 2, hereinafter referred to as an [operation region]. For example, when the control value a is set to be small (e.g., less than a predetermine limit), the operation region decreases. As a result, it is considered as a motion even if the absolute value |ΔF| is small. When the control value a is set to be large (e.g., greater than or equal to the predetermined limit), the operation region increases. As a result, it is considered as a stop even if the absolute value |ΔF| is large.

For example, since the differential between frames on an inclined region close to a flat region or a thin texture region in an image decreases even if there is significant motion, it is easy to determine a stop when motion determination is performed. As a result, it may also be connected to the occurrence of afterimage. When the control value a is fixed, it may be set in consideration of a trade-off between afterimage occurrence and the amount of noise reduction.

When the control value a is set in consideration of the aforementioned trade-off, it may be possible to decrease inter-frame noise having a relatively small amplitude. However, since inter-frame noise having a larger amplitude occurs in a region which includes an edge or texture, it may be difficult to sufficiently reduce inter-frame noise when the control value a is set in consideration of the trade-off described above.

In accordance with one embodiment, a control device controls a control value (e.g., "a" in FIG. 1), based on an image signal. This may be accomplished by controlling an operation region according to a reduction in noise, for example, in a first-order IIR filter, such as the IIR filter 10 in FIG. 1. The control device may control the control value based on the flat level of an image (hereinafter, referred to as [flatness]), which may be obtained based on and is represented by the image signal.

The control device may control the control value based on flatness according to the image signal. Thus, the control value may be dynamically adjusted by the image represented by the image signal. Thus, the first-order IIR filter (e.g., the frame IIR filter 10) using a control value controlled by the control device may decrease inter-frame noise having a relatively large amplitude that may occur in a region that includes an edge or texture. Also, the frame IIR filter 10 using a control value controlled by the control device may reduce or prevent the occurrence of afterimage.

Examples of how the control device controls the control value a for controlling an operation region according to a decrease in noise of the frame IIR filter 10 in FIG. 1 will now be discussed. Also, the first-order IIR filter to which the control value that is controlled by the control device is applied is not limited to the frame IIR filter 10 in FIG. 1. For example, the control value may be applied to an IIR filter that has any configuration for adjusting an operation region to achieve a decrease in noise.

Figure 3:
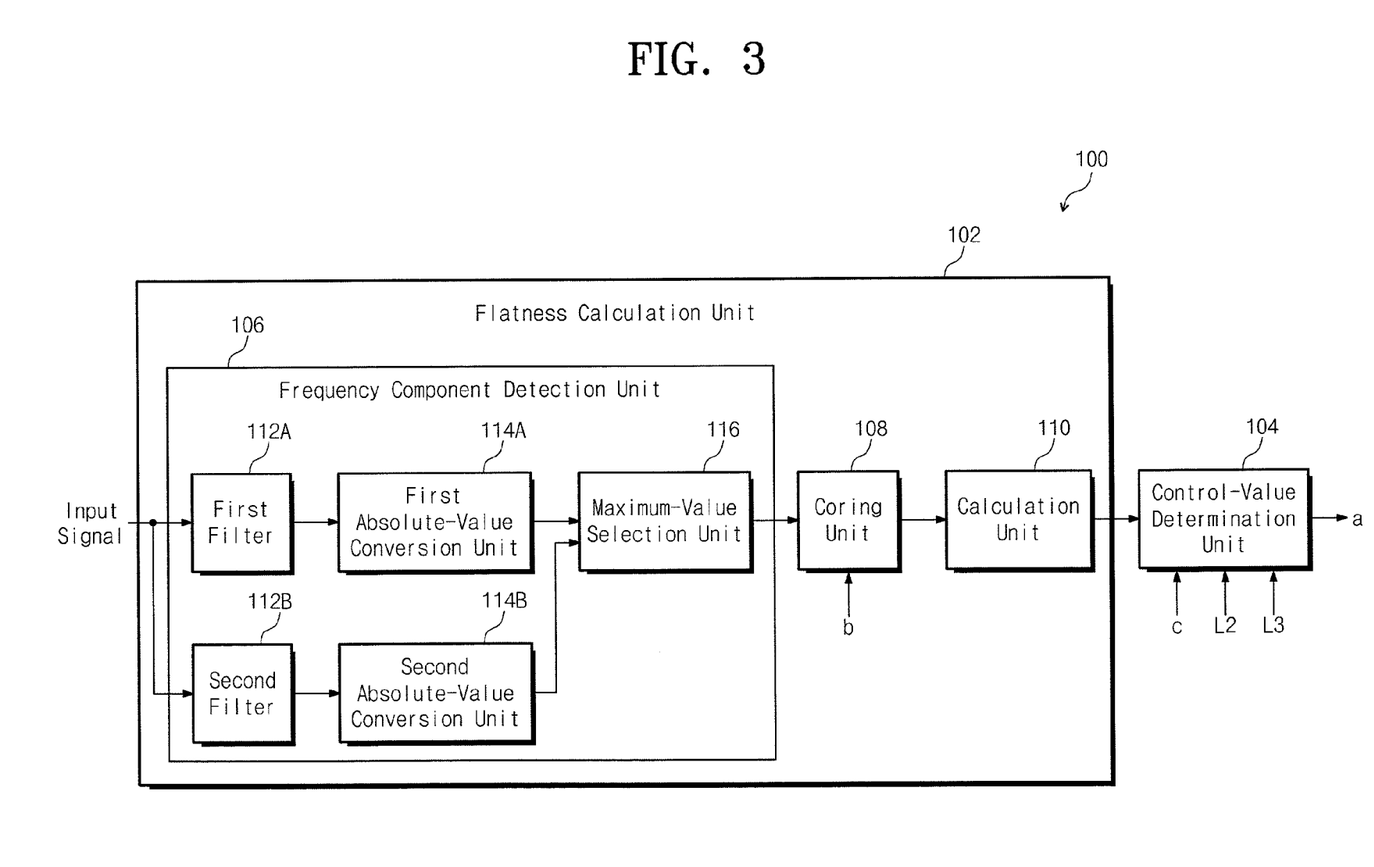
FIG. 3 illustrates an embodiment of a control device.

FIG. 3 illustrates an embodiment of the control device 100, which receives an input signal (e.g., image signal) input to the frame IIR filter 10 (which is an example of an IIR filter) and determines the control value a based on the input signal. The input signal input may include, e.g., a luminance signal or color signal.

The control device 100 includes a flatness calculation unit 102 and a control-value determination unit 104. The control device 100 includes a processor such as a central processing unit (CPU) or various processing circuits, and may also include a control unit for controlling the control device 100. When the control unit is included, the control unit in the control device 100 may also function as the flatness calculation unit 102 and the control-value determination unit 104.

Also, at least one of the flatness calculation unit 102 and the control-value determination unit 104 may be implemented in a separate processing circuit (e.g., a dedicated processing circuit or general-purpose processing circuit) from the control unit. Also, processing of at least one of the flatness calculation unit 102 or the control-value determination unit 104 may be performed by a program (software) executed by a processor.

The flatness calculation unit 102 calculates, based on an input signal (image signal), the flatness of an image represented by the input signal. The flatness calculation unit 102 includes a frequency component detection unit 106, a coring unit 108 (adjustment unit), and calculation unit 110.

The frequency component detection unit 106 detects a signal having a certain frequency band from the input signal. The frequency component detection unit 106 includes a first filter 112A, a second filter 112B, a first absolute-value conversion unit 114A, a second absolute-value conversion unit 114B, and a maximum-value selection unit 116.

The first filter 112A performs processing in a first direction of the image represented by the input signal and detects a signal having a certain frequency band. The first direction may be the horizontal or vertical direction of the image. The first filter 112A may include a high pass filter including a first-order finite impulse response (FIR) filter. The impulse response of the first filter 112A may have a short value, such as [0.5 −0.5], but a longer value is also possible.

When the first filter 112A is the high pass filter, the first filter 112A does not attenuate an input signal having a frequency higher than a certain frequency and attenuates input signals having other bands. In another embodiment, the first filter 112A may include a filter different from a high pass filter, such as a band pass filter.

The first absolute-value conversion unit 114A calculates the absolute value of an output of the first filter 112A.

The second filter 112B performs processing in the second direction of the image represented by the input signal and detects a signal having a certain frequency band. The second direction may be the vertical direction of the image (when the first direction is the horizontal direction) or the horizontal direction of the image (when the first direction is the vertical direction).

The second filter (112B) may include a same kind of filter as the first filter 112A, such as a high pass filter including the first-order FIR filter. When the second filter 112B is a high pass filter, the impulse response of the second filter 112B may be the same as the impulse response of the first filter 112A.

The second absolute-value conversion unit 114E calculates the absolute value of an output of the second filter 112B.

The maximum-value selection unit 116 outputs a larger value of the output of the first absolute-value conversion unit 114A and the output of the second absolute-value conversion unit 114E as a frequency component detection value, for every corresponding pixel. The maximum-value selection unit 116 compares the output of the first absolute-value conversion unit 114A with the output of the second absolute-value conversion unit 114B for every corresponding pixel by a comparator and selects a larger value for every pixel for output as a frequency component detection value.

The frequency component detection unit 106 includes the first filter 112A, the second filter 112B, the first absolute-value conversion unit 114A, the second absolute-value conversion unit 114B, and the maximum-value selection unit 116 and detects a signal having a certain frequency band from an input signal. In another embodiment, the frequency component detection unit 106 may have a different configuration for detecting a signal having a certain frequency band from the input signal.

The coring unit 108 adjusts the signal having the certain frequency band detected by the frequency component detection unit 106 to a preset adjustment value.

Figure 4:
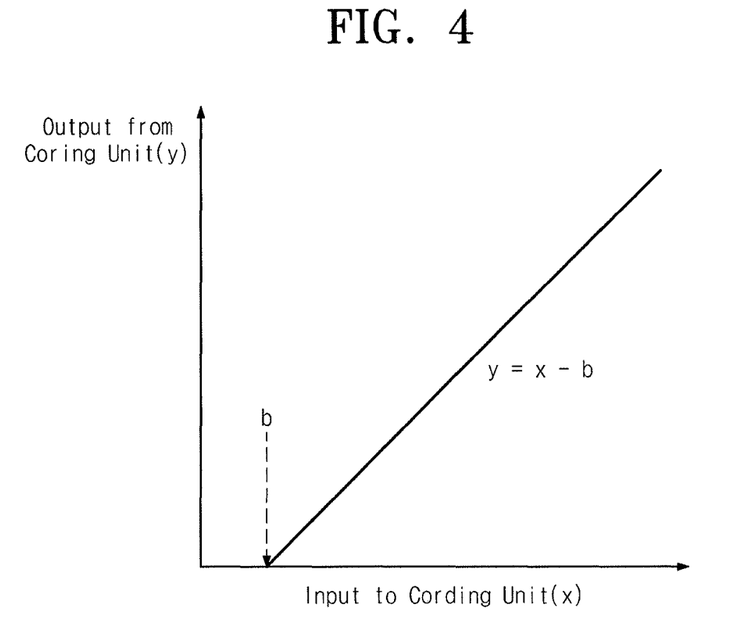
FIG. 4 illustrates an example explaining processing of the control.

FIG. 4 is a graph explaining an example of the processing performed by the control device 100, and specifically an example of the processing of the coring unit 108 that configures the flatness calculation unit 102 of the control device 100.

The processing of the coring unit 108 is performed by the function of the input x of the coring unit 108 (e.g., a signal having a certain frequency band detected from the frequency component detection unit 106), as shown in FIG. 4. The function in FIG. 4 may be realized by hardware or software.

The parameter b in FIG. 4 is a value satisfying b≥0 and corresponds to an adjustment value for adjusting the value of a signal having the certain frequency band detected from the frequency component detection unit 106.

The coring unit 108 adjusts the adjustment value b to the value of the signal having the certain frequency band detected from the frequency component detection unit 106. Thus, it is possible to exclude the small difference of a flat portion of an image. In this example, the adjustment value b may be a preset, fixed value and may be a variable value that may vary based on user manipulation. Also, when the adjustment value b is set to "0" (zero), it is possible to negate the processing of the coring unit 108.

The coring unit 108 adjusts the signal having the certain frequency band detected by the frequency component detection unit 106 to the adjustment value b, by the function in FIG. 4. Also, the processing of the coring unit 108 is not limited to adjusting the value of the signal having the certain frequency band detected by the function in FIG. 4. For example, the coring unit 108 may perform any function that excludes a small difference (e.g., below a predetermined value) of the flat portion of the image from flatness calculation.

The calculation unit 110 calculates flatness based on the signal having the adjusted frequency band transmitted from the coring unit 108. The calculation unit 110 takes the 2D average of the pixel values of a plurality of pixels including a target pixel in the same frame to calculate flatness. The calculation unit 110 calculates flatness for every pixel or every segmentation region set by the segmentation of the image represented by the input signal. When the flatness is calculated for every pixel, each pixel becomes the target pixel. Also, when the flatness is calculated for every segmentation region, a single pixel in a segmentation region becomes the target pixel and flatness calculated on the target pixel becomes the flatness of the segmentation region.

The calculation unit 110 sets a square region around the target pixel, and calculates the arithmetic mean of pixel values of pixels in the region to calculate flatness. In another embodiment, the calculation unit 110 may set a region of a different shape including but not limited to a rectangular region. Also, the size of the region may be set, for example, based on the resolution of the image represented by the input image or based on circuit processing cost or complexity. Also, flatness may be calculated by a weighted mean, instead of an arithmetic mean.

The smaller the value of flatness calculated by the calculation unit 110, the flatter the region is. The larger the value of flatness, the more uneven the region is.

The flatness calculation unit 102 includes the frequency component detection unit 106, the coring unit 108, and the calculation unit 110 and calculates flatness based on an input signal to obtain flatness based on the input signal.

The configuration of the flatness calculation unit 102 is not limited to that in FIG. 3. For example, in one embodiment, the flatness calculation unit 102 may not include the coring unit 108. When the coring unit 108 is not included, the calculation unit 110 calculates flatness based on the signal having the certain frequency band detected from the frequency component detection unit 106. Also, the flatness calculation unit 102 may have any configuration that calculates flatness based on the input signal (image signal).

The control-value determination unit 104 determines the control value a based on the flatness calculated by the flatness calculation unit 102. The control-value determination unit 104 determines the control value a so that the value of flatness is directly proportional to the size of the operation region, e.g., the smaller the value of flatness, the smaller the operation region of the IIR filter 10.

As described above, the operation region (e.g., A in FIG. 2) of the IIR filter 10 decreases as the value of the control value a decreases. Thus, the control-value determination unit 104 determines the control value a so that the smaller the value of flatness is, the smaller the operation region is. Thus, it is considered as a motion in the IIR filter 10 even if the absolute value |ΔF| is so small as to correspond to the difference between the input signal and the output of the IIR filter 10. As a result, the IIR filter 10 may reduce or prevent the occurrence of afterimage.

The control-value determination unit 104 may determine a control value equal to or larger than a set lower limit value (or control value larger than a corresponding lower limit value). The lower limit value of the control value a may be preset. Also, the control-value determination unit 104 may determine a control value equal to or larger than a preset lower limit value, in order to prevent a reduction in noise decrease effect due to an excessive decrease in the operation region of the IIR filter 10. This may reduce or prevent the occurrence of afterimage.

The control-value determination unit 104 determines the control value a so that the larger the value of flatness, the larger the operation region of the IIR filter 10.

As described above, the operation region (e.g., A in FIG. 2) of the IIR filter 10 increases as the value of the control value a increases. Thus, the control-value determination unit 104 determines the control value a so that the value of flatness is direction proportional to the size of the operation region, e.g., the larger the value of flatness, the larger the operation region. Thus, it is considered as a stop in the IIR filter 10 even if the absolute value |ΔF| is so large as to correspond to the difference between the input signal and the output of the frame IIR filter 10. As a result, a noise decrease effect is maintained in the frame IIR filter 10.

The control-value determination unit 104 may determine a control value equal to or smaller than a preset upper limit value. The upper limit value of the control value a may be preset. The control-value determination unit 104 determines the control value equal to or smaller than a preset upper limit value in order to reduce or prevent afterimage caused by an excessive increase in the operation region of the frame IIR filter 10, e.g., maintaining the noise decrease effect.

Figure 5:
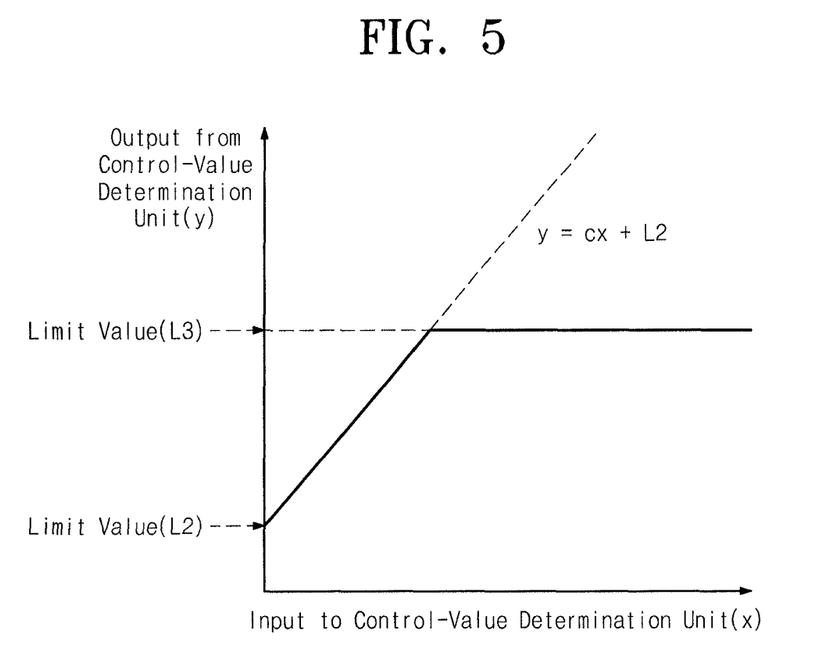
FIG. 5 illustrates another example explaining processing of the control device.

FIG. 5 is a graph explaining another example of processing of the control device 100. This example corresponds to processing of the control-value determination unit 104 of the control device 100.

In this example, processing by the control-value determination unit 104 is performed by the function of the input x of the control-value determination unit 104 (corresponding to the flatness calculated by the flatness calculation unit 102). The function in FIG. 5 may be performed, e.g., by hardware or software.

The parameters c, L2, and L3 in FIG. 5 are adjustment values according to the determination of the control value a. The parameter c is a value satisfying, e.g., c>. The parameter c may be preset based on the proportional relationship between flatness and an amount of noise. In one embodiment, the parameter c may vary, for example, based on user manipulation.

The parameter L2 is a limit value defining the lower limit value (minimum value) of the control value a. The lower limit value L2 may be a value of e.g., L2≥0. The parameter L in FIG. 5 may be a preset, fixed value or may be a variable value that varies based on user manipulation. When the lower limit value L2 is preset, the control-value determination unit 104 determines the control value a equal to or larger than the preset lower limit value L2, as represented in FIG. 5.

The parameter L3 is a limit value defining the upper limit value (maximum value) of the control value a. The upper limit value L3 may be a value of e.g., L3>L2. The parameter L3 may be a preset, fixed value or may be a variable value that varies based on user manipulation. When the upper limit value L3 is preset, the control-value determination unit 104 determines the control value a equal to or larger than the preset lower limit value L3, as represented in FIG. 5.

The control-value determination unit 104 determines the control value a based on the flatness calculated by the flatness calculation unit 102 based on the function in FIG. 5. Processing performed by the control-value determination unit 104 is not limited to determining the control value a based on the function in FIG. 5. In one embodiment, the control-value determination unit 104 may determine the control value a based on a function in which at least one of the lower limit value L2 or the upper limit value L3 in FIG. 5 is not set.

In one embodiment, the control device 100 includes the flat calculation unit 102 and the control-value determination unit 104, as represented in FIG. 3. In this example, the control-value determination unit 104 determines the control value a that controls an operation region according to a decrease in the noise of the first-order IIR filter according to flatness based on an input signal (image signal) calculated by the flatness calculation unit 102. Thus, the control device 100 may control, based on the image signal, the control value controlling the operation region according to the decrease in the noise of the first-order IIR filter, by the configuration in FIG. 3.

Also, the control value a determined by the control device 100 may be set for the first-order IIR filter (e.g., the frame IIR filter 10 in FIG. 1) so that the first-order IIR filter may not follow the flatness of the image represented by the input signal and may achieve both an afterimage inhibition effect and an inter-frame noise decrease effect.

In one embodiment, setting the control value a determined by the control device 100 for the first-order IIR filter may be performed by an external device of the control device 100. In this case, the external device may update the control value a stored in a recording medium that the first-order IIR filter (or device including the first-order IIR filter) set the control value a for the first-order IIR filter. In one embodiment, the external device may set the control value a for the first-order IIR filter according to any method that may perform processing by using the control value "a" newly set by the limitation unit of the first-order IIR filter.

In another embodiment, the control device may have a configuration different from the embodiment of FIG. 3. For example, the control device may include a setting unit to set the control value a determined by the control-value determination unit 104 for the first-order IIR filter. When the setting unit is included, the control value a is set by the setting unit for the first-order IIR filter.

Like the external device, the setting unit may set the control value a for the first-order IIR filter by updating the control value a stored in a recording medium that the first-order IIR filter includes.

In one embodiment, the control device may include a first-order IIR filter such as the frame IIR filter 10 in FIG. 1. When the first-order IIR filter is included, the control device may control the control value for controlling an operation region according to a decrease in the noise of the first-order IIR filter and according to flatness based on the input signal (image signal) input to the first-order IIR filter.

In one embodiment, a program for operating a computer may serve as or correspond to the control device. For example, the program may control the computer to perform the operations of the flatness calculation unit and the control value determination unit.

In another embodiment, a program may include code to control the computer to perform the operations of the flatness calculation unit, the control value determination unit, and the setting unit in order to control, based on an image signal, the control value for controlling an operation region according to a decrease in the noise of the first-order IIR filter. In another embodiment, all operations of the control device may be performed by a program controlling a computer. The aforementioned program(s) may be stored, for example, on a non-transitory computer-readable medium. Examples include a volatile or non-volatile memory or other storage device, which may be removably or fixedly coupled to the computer, processor, controller, or other signal processing device which is to execute the code or instructions for performing the embodiments described herein.

The flatness calculation unit, control value determination unit, calculator, and other processing features of the disclosed embodiments may be implemented in logic which, for example, may include hardware, software, or both. When implemented at least partially in hardware, the flatness calculation unit, control value determination unit, calculator, and other processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the flatness calculation unit, control value determination unit, calculator, and other processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

By way of summation and review, an image displayed on the screen may have inter-frame noise caused by quantization in a compression process. In accordance with one or more of the aforementioned embodiments, a control device allows a first-order infinite impulse response filter to control, based on an image signal, a control value for controlling a motion region according to a decrease in noise. The first-order IIR filter may not follow the flatness of the image represented by the input signal and may achieve both an afterimage inhibition effect and an inter-frame noise decrease effect.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the invention as set forth in the following claims.

What is claimed is:

1. A control device, comprising:
    a flatness calculation circuit configured to calculate flatness of an image corresponding to an image signal; a first-order infinite impulse response filter (IIR) to process the image signal to reduce noise; and
    control-value logic circuit connected to the flatness calculation circuit to receive the flatness, wherein the control-value logic determines a control value based on the flatness, the control value to control a size of an operation region based on the reduction in noise by the IIR filter.

2. The control device as claimed in claim 1, wherein the control value is equal to or greater than a preset, lower limit value or greater than a lower limit value.

3. The control device as claimed in claim 1, wherein the control value is equal to or less than a preset, upper limit value or less than an upper limit value.

4. The control device as claimed in claim 1, wherein the flatness calculation circuit includes:
    a frequency component detector to detect a signal of a predetermined frequency band from the image signal; and
    a calculator to calculate the flatness of the image based on the signal of the predetermined frequency band.

5. The control device as claimed in claim 4, wherein:
    the flatness calculation circuit includes an adjuster to adjust the signal of the certain frequency band, and
    the calculator is to calculate the flatness of the image based on the adjusted signal of the certain frequency band.

6. The control device as claimed in claim 1, further comprising:
    a setter to set the control value determined as the first-order IIR filter.

7. The control device as claimed in claim 1, further comprising the first-order IIR filter.

* * * * *